United States Patent
Huang et al.

(10) Patent No.: US 9,470,518 B2
(45) Date of Patent: Oct. 18, 2016

(54) DAILY CHECKING AND CALIBRATING METHOD OF LENGTH MEASURING MACHINE

(71) Applicant: Shenzhen China Star Optoelectronics Technology Co., Ltd., Shenzhen, Guangdong (CN)

(72) Inventors: Wende Huang, Shenzhen (CN); Yueyan Zhang, Shenzhen (CN); Houyi Zhu, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 691 days.

(21) Appl. No.: 14/003,041

(22) PCT Filed: Jun. 28, 2013

(86) PCT No.: PCT/CN2013/078249
§ 371 (c)(1),
(2) Date: Sep. 4, 2013

(87) PCT Pub. No.: WO2014/187012
PCT Pub. Date: Nov. 27, 2014

(65) Prior Publication Data
US 2015/0143871 A1 May 28, 2015

(30) Foreign Application Priority Data

May 24, 2013 (CN) .......................... 2013 1 0198726

(51) Int. Cl.
*G01B 21/04* (2006.01)
*G01B 9/02* (2006.01)

(52) U.S. Cl.
CPC ......... *G01B 21/042* (2013.01); *G01B 9/02055* (2013.01); *G01B 9/02072* (2013.04); *G01B 21/04* (2013.01); *G01B 21/045* (2013.01)

(58) Field of Classification Search
CPC ... G01B 21/04; G01B 21/045; G01B 9/02055; G01B 9/020722
USPC .............................................. 702/85; 73/1.81
See application file for complete search history.

(56) References Cited

U.S. PATENT DOCUMENTS

| 5,909,939 | A  | * | 6/1999 | Fugmann | ............... | G01B 5/008 33/503 |
| 7,359,817 | B2 | * | 4/2008 | Ban | ......................... | B25J 9/1692 356/2 |

(Continued)

FOREIGN PATENT DOCUMENTS

CN 102692831 A 9/2012
CN 102998824 A 3/2013

(Continued)

*Primary Examiner* — John Breene
*Assistant Examiner* — Lynda Dinh
(74) *Attorney, Agent, or Firm* — Andrew C. Cheng (57) ABSTRACT

A daily checking and calibrating method includes the following steps. Step (1) is for detecting a state of the length measuring machine at a predetermined daily check time. Step (2) is for stopping the transportation of substrates upon determining the length measuring machine is in an idle state. Step (3) is for measuring coordinates of positioning marks on a substrate-carrying platform to generate a measured data file and comparing the measured coordinates of the positioning marks with predetermined coordinates. Step (4) is for automatically calculating a calibration value when a difference between the measured coordinates of the positioning marks and the predetermined coordinates is smaller than a predetermined value and updating the calibration value to a coordinate parameter file to complete automatic calibration. Otherwise, an alarm is activated. Step (5) is for determining follow-up measures when the difference between the measured coordinates of the positioning marks and the predetermined coordinates is larger than the predetermined value.

11 Claims, 3 Drawing Sheets

(56) References Cited

U.S. PATENT DOCUMENTS

| | | | | |
|---|---|---|---|---|
| 8,037,736 | B2* | 10/2011 | Banke, Jr. | G01B 21/042 324/750.02 |
| 8,219,353 | B2* | 7/2012 | Lee | G01B 5/08 33/502 |
| 2009/0326849 | A1* | 12/2009 | MacManus | G01B 21/042 702/95 |

FOREIGN PATENT DOCUMENTS

| | | |
|---|---|---|
| CN | 103075970 A | 5/2013 |
| CN | 103292709 A | 9/2013 |
| JP | 2011164590 A | 8/2011 |
| WO | WO2012053402 A | 4/2012 |

* cited by examiner

DAILY CHECKING AND CALIBRATING METHOD OF LENGTH MEASURING MACHINE

BACKGROUND OF THE INVENTION

1. Field of the Invention

The present disclosure relates to measurement technology, and more particularly to a daily checking and calibrating method of a length measuring machine.

2. Discussion of the Related Art

Length measuring machines (TTP) are important optical measurement machines in TFT-LCD manufacturing process. The length measuring machines are mainly for measuring a total pitch of exposure machines while manufacturing the first layer patterns of thin film transistor (TFT) substrate or color filtering (CF) substrates. Generally, the total pitch measurement is conducted by Michelson interferometer, which adopts laser beams with only one frequency to calculate the strength of interference fringes. The stability or intensity of the laser beams, the temperature, or the hardware may result in unstable measurement or serious exceptions. As a result, real characteristics may not be reflected correctly. Furthermore, the exposure machines may be erroneously detected, which may seriously affected the manufacturing process.

Currently, two main suppliers of the above length measuring machines are Spray company and Valve company. The daily checking and calibrating methods of the length measuring machine manufactured by Spray company ("Spray machine") and the Valve company ("Valve machine) will be described as below.

Regarding the daily checking of the Spray machine, a constant-temperature buffer, which is above the machine, is disposed with a large number of large-scale substrates for daily checking. After the daily check function is activated by operators, the robot transports the large-scale substrate from the constant-temperature buffer to the marked location of the length measuring machine. Normally, the marked locations are identified by engineers at four corners of the large-scale substrate in accordance with the points of the large-scale substrate. After the measurement, the large-scale substrate is then transported back to the constant-temperature buffer.

With respect to the automatic calibration of the Spray machine, a non-segmented glass table is adopted for carrying the substrate. Four corners of the glass table are adhered with cross-shaped marks. During the software initialization, the coordinates of the four cross-shaped marks are calculated and compared with initial coordinates to obtain the calibration coordinates and to update the coordinate system.

The disadvantages of the Spray machine can be concluded as below. The daily checking is not automatically conducted as the daily check function has to be activated by the operators. Also, as the transportation rules of the robot are complex and the robot generally is controlled by different departments, the robot may have to be configured by employees in other departments. Thus, the daily checking cannot be alarmed and handled automatically at the first moment. Upon detecting the exceptions, it is difficult to identify the reasons causing the exceptions, i.e., the exception is caused by the substrate or by the length measuring machine. In addition, the automatic calibration can also be conducted during the software initialization. The automatic calibration cannot be executed at the predetermined time and cannot be executed automatically. However, during the manufacturing process, the length measuring machine has to be in the auto mode, which means that the manual operations or software re-initialization are not allowed. There are also no alarm and prevention mechanism for automatic calibration. When the temperature or the hardware is abnormal the important risk regarding the calibration may occur.

With respect to automatic calibration of the Valve machine, a constant-temperature buffer, which is above the machine, is disposed with a large number of large-scale substrates for daily checking. By activating the daily check function by operators. the robot transports the large-scale substrate from the constant-temperature buffer to the marked location of the machine. Normally, the marked locations are identified by engineers at four corners of the large-scale substrate in accordance with the points of the large-scale substrate. After the measurement, the large-scale substrate is then transported back to the constant-temperature buffer.

The Valve machine has no automatic calibration mechanism. Upon detecting exceptions, the operator has to conduct the daily checking, and then adjusts the coordinate parameters manually until the coordinate parameters meet the specifications.

The disadvantages of the Valve machine can be concluded as below. The daily checking can only be activated by the operators. In addition, as the transportation rules of the robot are complex and the robot generally is controlled by different departments, the robot may have to be configured by employees in other departments. The daily checking cannot be alarmed and handled automatically at the first moment. Upon detecting the exceptions, it is difficult to identify the reasons causing the exceptions, i.e., the exception is caused by the substrate or by the length measuring machine. In addition, the Valve machine does not include automatic calibration mechanism. When performing manual calibration, a large amount of large-scale substrates have to transported to the length measuring machine. The operations are not only complex but also take a longer time, which is about two to four hours. Also, the operator has to be well-experienced. Furthermore, instead of adopting a non-segmented glass table, Valve machine assembles a plurality of glasses to be the glass table on the sample holder. Unlike the Spray machine, the marks of the Valve machine are adheres to the sample holder of the glass table. In the testing process, the unstable sample holder may result in a location difference with ±1 μm. Therefore, the measured values cannot be adopted as reference values. Also, the measured values cannot be adopted to perform the automatic calibration.

SUMMARY

The object of the invention is to provide a daily checking and calibrating method of a length measuring machine that can be conducted precisely and the stability of the measurement can be enhanced. In addition, upon detecting the exceptions, the length measuring machine notifies the operators at the first moment such that the stability of total pitch measurement is improved.

In one aspect, a daily checking and calibrating method of a length measuring machine includes the following steps:

step (1) for detecting a state of the length measuring machine at a predetermined daily check time;

step (2) for stopping transportation of substrates and the process goes to step (3) upon determining the length measuring machine is in the idle state, and for waiting until the length measuring machine transit to the idle state if the length measuring machine is in an operational state;

step (3) for measuring coordinates of positioning marks on a substrate-carrying platform to generate a measured data file, and for comparing the measured coordinates of the positioning marks with predetermined standard coordinates;

step (4) for automatically calculating a calibration value, updating the calibration value to a coordinate parameter file to complete automatic calibration, and automatically backing up the coordinate parameter file, and then the process goes to step (14) when a difference between the measured coordinates of the positioning marks and the predetermined standard coordinates is smaller than a predetermined value, and for activating an alarm and then the process goes to step (5) when the difference between the measured coordinates of the positioning marks and the standard coordinate is larger than the predetermined value;

step (5) for determining follow-up measures when the difference between the measured coordinates of the positioning marks and the predetermined standard coordinates is larger than the predetermined value, the determination is made in accordance with a predicted reason causing the difference, and the follow-up measures includes automatic calibration, no calibration, and additional measurements of large-scale substrate;

step (6)—the process goes to step (7) upon choosing the automatic calibration, the process goes to step (13) upon determining not to apply the automatic calibration, and the process goes to step (8) upon choosing the additional measurement of the large-scale substrate;

step (7) for automatically calculating the calibration value basing on the measured data file generated in step (3), updating the calibration value to the coordinate parameter file to complete the automatic calibration, and backing up the original coordinate parameter file and the process goes to step (14);

step (8) for measuring the coordinates of confirmation marks of the large-scale substrate on the substrate-carrying platform to generate a substrate-measured-data file, and for comparing the measured coordinates of the confirmation marks and the predetermined confirmation coordinates;

step (9) for automatically calculating the calibration value basing on the measured data file generated in step (3), updating the calibration value to the coordinate parameter file to complete the automatic calibration and the process goes to step (14), and automatically backing up the coordinate parameter file when the difference between the measured coordinate of the confirmation marks and the predetermined confirmation coordinate is smaller than the predetermined value, and for activating the alarm and the process goes to step (10) when the difference between the measured coordinates of the confirmation marks and the predetermined confirmation coordinates is larger than the predetermined value;

step (10) for determining the follow-up measures when the difference between the measured coordinates of the confirmation marks and the predetermined confirmation coordinates is larger than the predetermined value, the determination is made in accordance with a predicted reason causing the difference, and the follow-up measures includes applying automatic calibration or not to apply automatic calibration;

step (11) for executing the automatic calibration and the process goes to step (12), and the process goes to step (13) when the follow-up measure is not to apply automatic calibration;

step (12) for automatically calculating the calibration value basing on the measured data file generated in step (3), updating the calibration value to the coordinate parameter file to complete the automatic calibration, and backing up the original coordinate parameter and the process goes to step (14);

step (13)—the process goes to step (14) upon determining not to apply the automatic calibration, the process goes to step (15) upon determining the length measuring machine is in an abnormal operation state comprising components dislocations and abnormal temperature;

step (14) for resuming a substrate-transportation function and the process ends;

step (15) for notifying of the abnormal operation state of the length measuring machine, and the process ends.

The substrate-carrying platform includes four cross-shaped positioning marks arranged at four corners, the length of the positioning marks is in the range of between 500 μm and 1000 μm, and the width of the positioning marks is in the range of between 20 μm and 50 μm.

The positioning marks are directly formed on the substrate-carrying platform by jet printing or titler.

The positioning marks are respectively formed on an adhesive board, and the adhesive boards are adhered to the substrate-carrying platform by glues.

The positioning marks are formed by Cr or photoresist, and when the positioning marks are formed by the photoresist, a protective film is formed outside the positioning marks, and the protective film is made by ITO layer or Si layer.

A coordinate system of the substrate-carrying platform is established by the steps of:

step (101) for respectively defining the four positioning marks as a first point, a second point, a third point, and a fourth point, the first point and the fourth point are arranged along diagonals of the substrate-carrying platform, the second point and the third point are arranged along diagonals of the substrate-carrying platform, and for measuring the coordinates of the four points;

step (102) for calculating a middle point of the first point and the third point and labeling the middle point as "A", and for calculating the middle point of the second point and the fourth point and labeling the middle point as "B";

step (103) for calculating the middle point of the point "A" and the point "B" and labeling the middle point as "O"; and step (104) for defining the point "O" as an origin, the direction from the third point toward the first point is the positive direction of a Y axis, and the direction from the third point toward the fourth point is the positive direction of a X axis to establish the coordinate system of the substrate-carrying platform.

Standard coordinates of the first point, the second point, the third point, and the fourth point are represented as $(X_1, Y_1)$, $(X_2, Y_2)$, $(X_3, Y_3)$ and $(X_4, Y_4)$, and the measured coordinates of the first point, the second point, the third point, and the fourth point are represented as $(X'_1, Y'_1)$, $(X'_2, Y'_2)$, $(X'_3, Y'_3)$, and $(X'_4, Y'_4)$, the calibration values are calculated by:

$$\Delta X(\text{The calibration value in the } X \text{ axis}) = [(X'_1 - X_1 + X'_4 - X_4)/2 - (X'_2 - X_2 + X'_3 - X_3)/2]/2;$$

$$\Delta Y(\text{The calibration value in the } Y \text{ axis}) = [(Y'_3 - Y_3 + Y'_4 - Y_4)/2 - (Y'_1 - Y_1 + Y'_2 - Y_2)/2]/2; \text{ and}$$

$$\Delta \theta(\text{The calibration value in the orthogonal axis}) = [(X'_3 - X_3 + X'_4 - X_4)/2 - (X'_1 - X_1 + X'_2 - X_2)/2]/2.$$

The step (8) further includes transporting the large-scale substrates from a constant-temperature buffer to the substrate-carrying platform by a robot, and transporting the large-scale substrates from the substrate-carrying platform to the constant-temperature buffer by the robot after the measurement is completed.

The measured data files generated in step (3) are named by date information.

The length measuring machine is a TFT-LCD length measuring machine for measuring a total pitch of exposure machines while manufacturing a first layer patterns of thin film transistor (TFT) substrate or color filtering (CF) substrates.

In another aspect, the daily checking and calibrating method of a length measuring machine includes the following steps:

step (1) for detecting a state of the length measuring machine at a predetermined daily check time;

step (2) for stopping transportation of substrates and the process goes to step (3) upon determining the length measuring machine is in the idle state, and for waiting until the length measuring machine transit to the idle state if the length measuring machine is in an operational state;

step (3) for measuring coordinates of positioning marks on a substrate-carrying platform to generate a measured data file, and for comparing the measured coordinates of the positioning marks with predetermined standard coordinates;

step (4) for automatically calculating a calibration value, updating the calibration value to a coordinate parameter file to complete automatic calibration, and automatically backing up the coordinate parameter file, and then the process goes to step (14) when a difference between the measured coordinates of the positioning marks and the predetermined standard coordinates is smaller than a predetermined value, and for activating an alarm and then the process goes to step (5) when the difference between the measured coordinates of the positioning marks and the standard coordinate is larger than the predetermined value;

step (5) for determining follow-up measures when the difference between the measured coordinates of the positioning marks and the predetermined standard coordinates is larger than the predetermined value, and the follow-up measures includes automatic calibration, no calibration, and additional measurement of large-scale substrate;

step (6)—the process goes to step (7) upon choosing the automatic calibration, the process goes to step (13) upon determining not to apply the automatic calibration, and the process goes to step (8) upon choosing the additional measure of the large-scale substrate;

step (7) for automatically calculating the calibration value basing on the measured data file generated in step (3), updating the calibration value to the coordinate parameter file to complete the automatic calibration, and backing up the original coordinate parameter file and the process goes to step (14);

step (8) for measuring the coordinates of confirmation marks of the large-scale substrate on the substrate-carrying platform to generate a substrate-measured-data file, and for comparing the measured coordinates of the confirmation marks and the predetermined confirmation coordinates;

step (9) for automatically calculating the calibration value basing on the measured data file generated in step (3), updating the calibration value to the coordinate parameter file to complete the automatic calibration and the process goes to step (14), and automatically backing up the coordinate parameter file when the difference between the measured coordinate of the confirmation marks and the predetermined confirmation coordinate is smaller than the predetermined value, and for activating the alarm and the process goes to step (10) when the difference between the measured coordinates of the confirmation marks and the predetermined confirmation coordinates is larger than the predetermined value;

step (10) for determining the follow-up measures when the difference between the measured coordinates of the confirmation marks and the predetermined confirmation coordinates is larger than the predetermined value, the determination is made in accordance with a predicted reason causing the difference, and the follow-up measures includes applying automatic calibration or not to apply automatic calibration;

step (11) for executing the automatic calibration and the process goes to step (12), and the process goes to step (13) when the follow-up measure is not to apply automatic calibration;

step (12) for automatically calculating the calibration value basing on the measured data file generated in step (3), updating the calibration value to the coordinate parameter file to complete the automatic calibration, and backing up the original coordinate parameter and the process goes to step (14);

step (13) the process goes to step (14) upon determining not to apply the automatic calibration, the process goes to step (15) upon determining the length measuring machine is in an abnormal operation state comprising components dislocations and abnormal temperature;

step (14) for resuming a substrate-transportation function and the process ends;

step (15) for notifying of the abnormal operation state of the length measuring machine, and the process ends;

wherein the substrate-carrying platform includes four cross-shaped positioning marks arranged at four corners, the length of the positioning marks is in the range of between 500 μm and 1000 μm, and the width of the positioning marks is in the range of between 20 μm and 50 μm;

wherein the positioning marks are directly formed on the substrate-carrying platform by jet printing or titler;

wherein the positioning marks are formed by Cr or photoresist, and when the positioning marks are formed by the photoresist, a protective film is formed outside the positioning marks, and the protective film is made by ITO layer or Si layer;

wherein a coordinate system of the substrate-carrying platform is established by the following steps:

step (101) for respectively defining the four positioning marks as a first point, a second point, a third point, and a fourth point, the first point and the fourth point are arranged along diagonals of the substrate-carrying platform, the second point and the third point are arranged along diagonals of the substrate-carrying platform, and for measuring the coordinates of the four points;

step (102) for calculating a middle point of the first point and the third point and labeling the middle point as "A", and for calculating the middle point of the second point and the fourth point and labeling the middle point as "B";

step (103) for calculating the middle point of the point "A" and the point "B" and labeling the middle point as "O"; and step (104) for defining the point "O" as an origin, the direction from the third point toward the first point is the positive direction of the Y axis, and the direction from the third point toward the fourth point is the positive direction of the X axis to establish the coordinate system of the substrate-carrying platform;

wherein standard coordinates of the first point, the second point, the third point, and the fourth point are represented as $(X_1, Y_1)$, $(X_2, Y_2)$, $(X_3, Y_3)$ and $(X_4, Y_4)$, and measured coordinates of the first point, the second point, the third point, and the fourth point are represented as $(X'_1, Y'_1)$, $(X'_2, Y'_2)$, $(X'_3, Y'_3)$, and $(X'_4, Y'_4)$, the calibration values are calculated by:

$$\Delta X \text{(The calibration value in the } X \text{ axis)} = [(X'_1 - X_1 + X'_4 - X_4)/2 - (X'_2 - X_2 + X'_3 - X_3)/2]/2;$$

$$\Delta Y \text{(The calibration value in the } Y \text{ axis)} = [(Y'_3 - Y_3 + Y'_4 - Y_4)/2 - (Y'_1 - Y_1 + Y'_2 - Y_2)/2]/2; \text{ and}$$

$$\Delta \theta \text{(The calibration value in the orthogonal axis)} = [(X'_3 - X_3 + X'_4 - X_4)/2 - (X'_1 - X_1 + X'_2 - X_2)/2]/2;$$

wherein step (8) further includes transporting the large-scale substrates from a constant-temperature buffer to the substrate-carrying platform by a robot, and transporting the large-scale substrates from the substrate-carrying platform to the constant-temperature buffer by the robot after the measurement is completed;

wherein the measured data files generated in step (3) are named by date information; and wherein the length measuring machine is a TFT-LCD length measuring machine for measuring a total pitch of exposure machines while manufacturing a first layer patterns of thin film transistor (TFT) substrate or color filtering (CF) substrates.

In view of the above, by incorporating the substrate-carrying platform and the large-scale substrate, the daily checking and calibrating method of the length measuring machine conducts the daily checking perfectly and efficiently. The stability of the measurement of the total pitch of the length measuring machine is enhanced. In addition, upon detecting the exceptions, the length measuring machine notifies the operators at the first moment such that the stability of total pitch measurement is improved.

In order to further understand the characteristics of the invention as well as technical content, see the following detailed description of the present invention and the accompanying drawings, drawings, however, for reference purposes only and description of use is not intended to limit the present invention.

BRIEF DESCRIPTION OF THE DRAWINGS

Below in conjunction with the accompanying drawings, through a specific embodiment of the present invention is described in detail, and will make apparent the technical solution of the present invention, and other beneficial effects.

DETAILED DESCRIPTION OF THE EMBODIMENTS

Embodiments of the invention will now be described more fully hereinafter with reference to the accompanying drawings, in which embodiments of the invention are shown.

Figure 1:
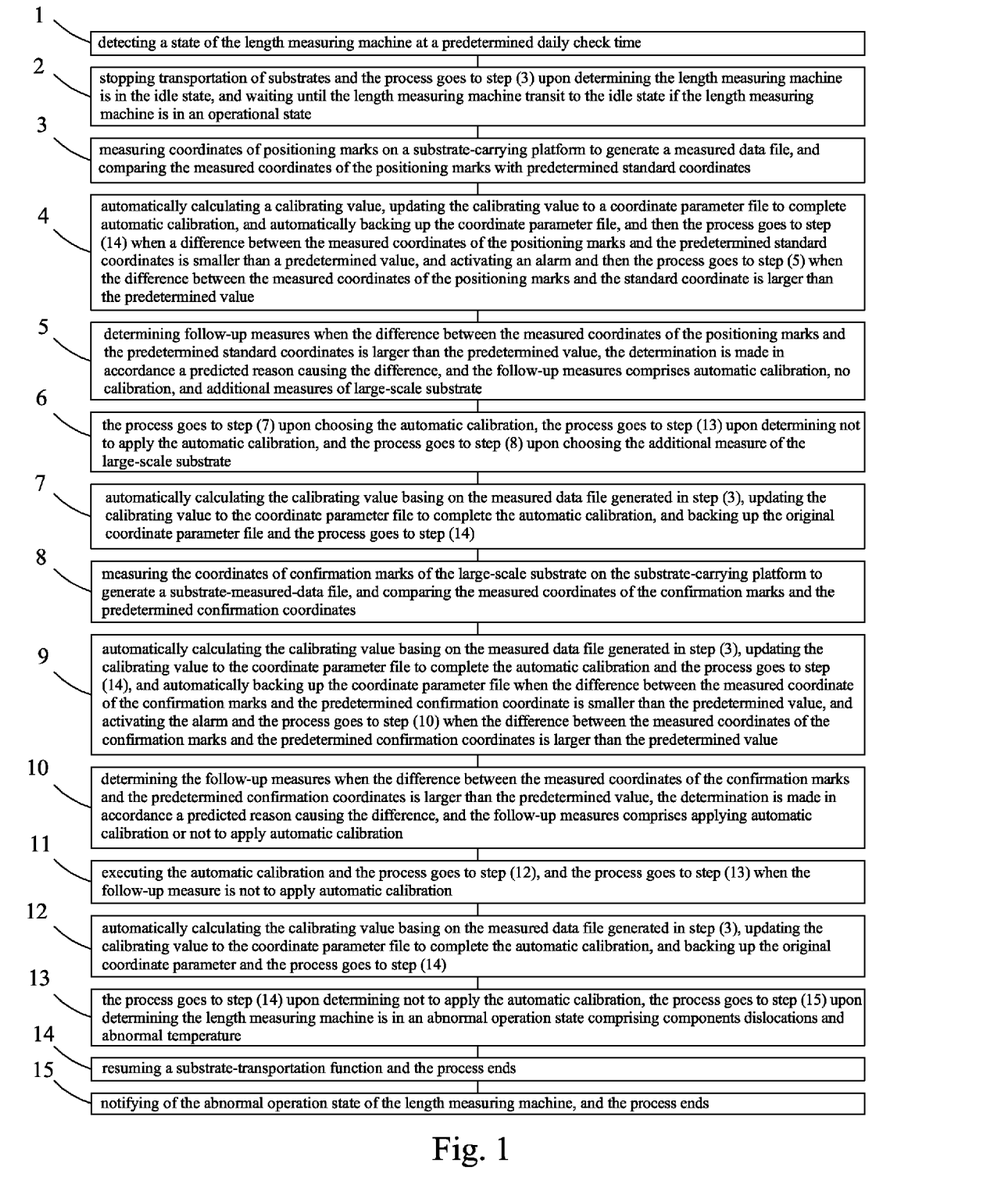
FIG. 1 is a flowchart illustrating the daily checking and calibrating method of a length measuring machine in accordance with one embodiment.
Figure 2:
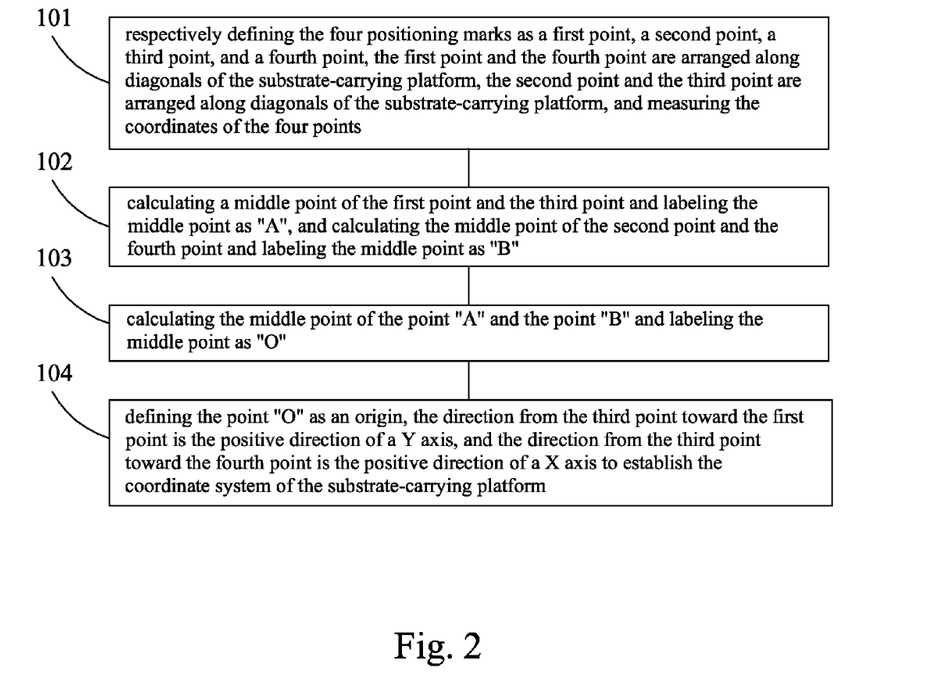
FIG. 2 is a flowchart illustrating the establishment of the coordinate system in accordance with one embodiment.
Figure 3:
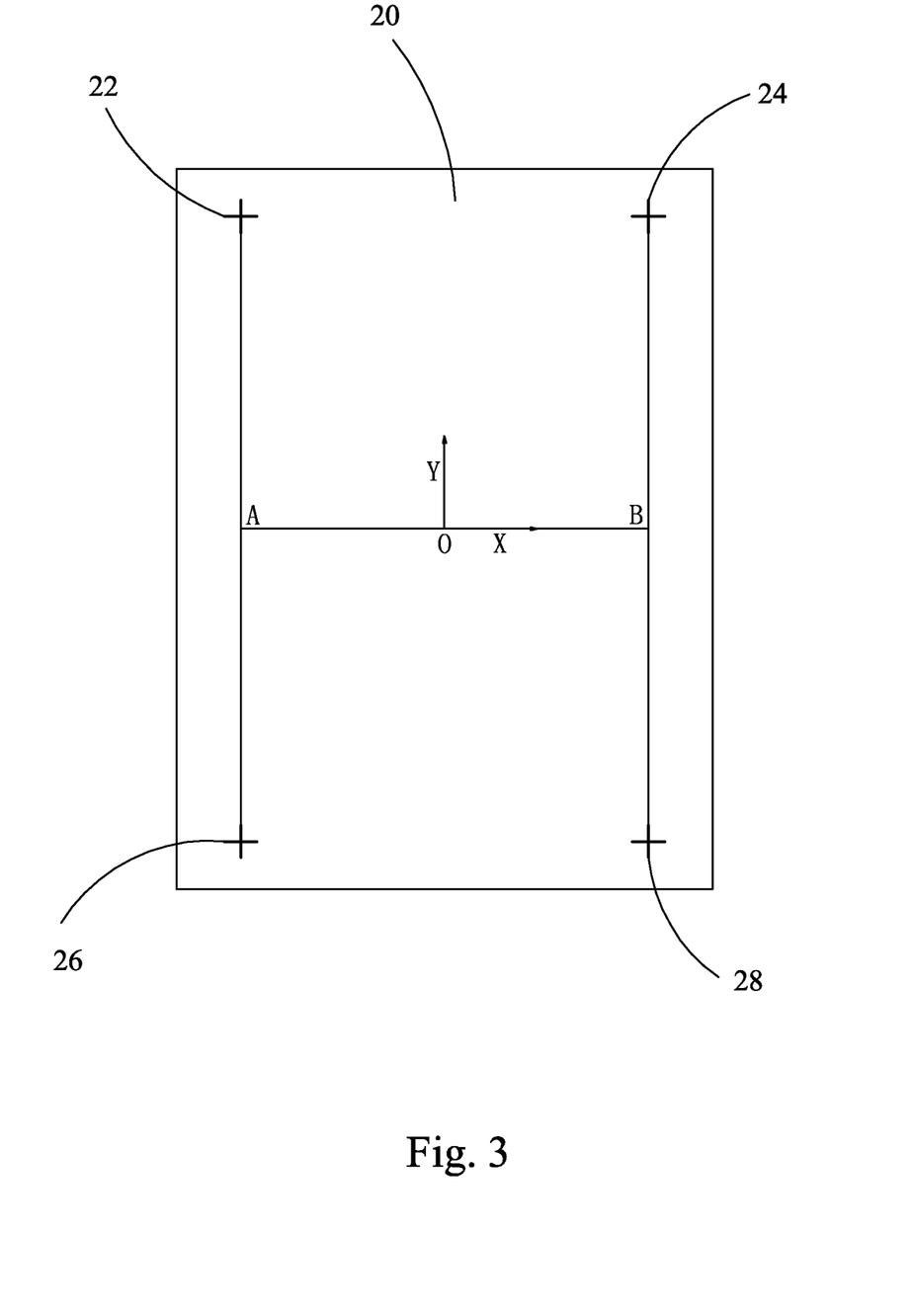
FIG. 3 is a schematic view of the coordinate system in accordance with one embodiment.

FIGS. 1 to 3 relate to the daily checking and calibrating method of a length measuring machine in accordance with one embodiment.

In step S1, the operation state of the length measuring machine is detected at a predetermined daily-check time. The detection is automatically activated by the software to determine whether the machine is in an idle state or in an operational state.

In step S2, if the length measuring machine is in the idle state, the process stops transporting the substrates and then the process goes to step S3. If the length measuring machine is in the operational state, the process waits until the length measuring machine transits to the idle state.

In step S3, the coordinates of positioning marks on the substrate-carrying platform 20 are measured to generate a measured data file. The measured coordinates of the positioning marks are compared with predetermined standard coordinates.

The measured data files are saved with filename indicate by date information for future reference.

The substrate-carrying platform 20 includes four positioning marks arranged at four corners. The positioning marks are cross-shaped. The length of the positioning marks is in the range of between 500 μm and 1000 μm, and the width of the positioning marks is in the range of between 20 μm and 50 μm.

In one embodiment, the positioning marks are directly formed on the substrate-carrying platform 20 by jet printing or titler. In other embodiments, the positioning marks are respectively formed on an adhesive board, and then the adhesive boards are adhered to the substrate-carrying platform 20 by glues. Preferably, the positioning marks are formed on glasses. In the embodiment, the positioning marks are formed by Cr or photoresist. Regarding the positioning marks formed by the photoresist, a protective film is formed outside the positioning marks. The protective film is made by ITO layer or Si layer.

The predetermined standard coordinate are positioning marks measured in a coordinate system of the substrate-carrying platform 20. The predetermined standard coordinate are saved in the length measuring machine in advance. Referring to FIGS. 2 and 3, the establishment of the coordinate system includes the following steps.

In step S101, the four positioning marks are respectively defined as a first point, a second point, a third point, and a fourth point 22, 24, 26, 28. The first point 22 and the fourth point 28 are arranged along diagonals of the substrate-carrying platform. Similarly, the second point 24 and the third point 26 are arranged along diagonals of the substrate-carrying platform as shown in FIG. 3. The coordinates of the four points 22, 24, 26, 28 are measured.

In step S102, a middle point of the first point 22 and the third point 26 is calculated and labeled as "A". Similarly, the middle point of the second point 24 and the fourth point 28 is calculated and labeled as "B".

In step S103, the middle point between point "A" and point "B" is labeled as "O".

In step S104, the point "O" is defined as the origin. The direction from the third point 26 toward the first point 22 is the positive direction of the Y axis. The direction from the third point 26 toward the fourth point 28 is the positive direction of the X axis. The coordinate system is established in this way In step S4, if the difference between the measured coordinates of the positioning marks and the standard coordinates is smaller than a predetermined value, a calibration value is automatically calculated. The calibration value is then updated to a coordinate parameter file so as to complete the automatic calibration. At the same time, the coordinate parameter file is also automatically backed up, and the process goes to step S14. If the difference between the measured coordinates of the positioning marks and the standard coordinate is larger than the predetermined value, an alarm is activated. At the moment, an alarm window is popped up and the difference is shown such that the operators can do further check, and the process goes to step S5.

The coordinate parameter file is used to recovery when the exceptions occur.

To further clarify, the standard coordinates of the first point 22, the second point 24, the third point 26, and the fourth point 28 are represented as $(X_1, Y_1), (X_2, Y_2), (X_3, Y_3)$ and $(X_4, Y_4)$. The measured coordinates of the first point 22, the second point 24, the third point 26, and the fourth point 28 are represented as $(X'_1, Y'_1), (X'_2, Y'_2), (X'_3, Y'_3),$ and $(X'_4, Y'_4)$. The calibration values are calculated by the equations below.

$$\Delta X(\text{The calibration value in the } X \text{ axis}) = [(X'_1 - X_1 + X'_4 - X_4)/2 - (X'_2 - X_2 + X'_3 - X_3)/2]/2;$$

$$\Delta Y(\text{The calibration value in the } Y \text{ axis}) = [(Y'_3 - Y_3 + Y'_4 - Y_4)/2 - (Y'_1 - Y_1 + Y'_2 - Y_2)/2]/2;$$

$$\Delta \theta(\text{The calibration value in the orthogonal axis}) = [(X'_3 - X_3 + X'_4 - X_4)/2 - (X'_1 - X_1 + X'_2 - X_2)/2]/2.$$

Generally, the predetermined range is about +0.5 μm, and can be configured in accordance with real scenarios.

In this step, if the difference between the measured coordinate and the predetermined standard coordinate is larger than the predetermined value, the alarm is activated. At the moment, the alarm window is popped up and the difference is shown such that the operators can do further check. Such mechanism contributes to the management, the shown difference is more convenient and user friendly, and the efficiency is enhanced.

In step S5, a follow-up measure is determined while the difference between the measured coordinate and the predetermined standard coordinate is larger than the predetermined value. The determination is made in accordance with a predicted reason causing the difference. The follow-up measures include automatic calibration, no calibration, or an additional measurement of the large-scale substrate.

The above three follow-up measures need the operators to input the account and the password to complete the login procedure so as to avoid erroneous manipulation.

In step S6, when the follow-up measure is to apply the automatic calibration, the process goes to step S7. When the follow-up measure is not to apply the automatic calibration, the process goes to step S13. When the follow-up measure is to perform the additional measurement of the large-scale substrate, the process goes to step S8.

After completing the login procedure, the operators choose the corresponding measures. For example, when the difference is slightly smaller than the predetermined value, the corresponding measure may be automatic calibration. When the length measuring machine is in an abnormal operation, i.e., components dislocations or abnormal temperature, and results in that the above difference is larger than the predetermined value, the automatic calibration cannot be adopted. The process has to be ended.

In step S7. the calibration value is calculated basing on the measured data file generated in step S3. In addition, the calibration value is updated to the coordinate parameter file to complete the automatic calibration. At the same time, the original coordinate parameter file is backed up and the process goes to step S14.

In step S8, the coordinates of the confirmation marks of the large-scale substrate on the substrate-carrying platform 20 are measured to generate a substrate-measured-data file. In addition, the measured coordinates of the confirmation marks and the predetermined confirmation coordinates are compared.

The large-scale substrate (not shown) includes a substrate and four positioning marks arranged at four corners of the substrates. Preferably, the four confirmation marks of the large-scale substrate are arranged closely to the four positioning marks of the substrate-carrying platform 20. The confirmation marks are formed by the same method as the positioning marks.

The predetermined confirmation coordinates are the coordinates of the four confirmation marks measured by the coordinate system of the large-scale substrate. The coordinate system of the large-scale substrate is also established by the same method as the coordinate system of the platform. The coordinate system and the predetermined confirmation coordinate are stored within the length measuring machine.

In this step, the large-scale substrates are transported from the constant-temperature buffer (not shown) to the substrate-carrying platform 20 by the robot (not shown). After being measured, the large-scale substrate is transported from the substrate-carrying platform 20 to the constant-temperature buffer by the robot.

In step S9, if the difference between the measured coordinate of the confirmation marks and the predetermined confirmation coordinate is smaller than the predetermined value, the calibration value is automatically calculated basing on the measured data file generated in step S3. In addition, the calibration value is updated to the coordinate parameter file of the platform to complete the automatic calibration. At the same time, the coordinate parameter file is also automatically backed up, and the process goes to step S14. If the difference between the measured coordinates of the confirmation marks and the predetermined confirmation coordinates is larger than the predetermined value, the alarm is activated and the process goes to step S10.

In step S10, the follow-up measure is determined when the difference between the measured coordinates of the confirmation marks and the predetermined confirmation coordinates is larger than the predetermined value. The determination is made in accordance with a predicted reason causing the difference.

In step S11, when the follow-up measure is to apply the automatic calibration, the automatic calibration is executed and the process goes to step S12. When the follow-up measure is not to apply the automatic calibration, the process goes to step S13.

In step S12, the calibration value is calculated basing on the measured data file generated in step S3. In addition, the calibration value is updated to the coordinate parameter file to complete the automatic calibration. At the same time, the original coordinate parameter file is backed up and the process goes to step S14.

In step S13, when the follow-up measure is not to apply the automatic calibration, the process goes to step S14. If the length measuring machine is in the abnormal operation state, the process goes to step S15. The abnormal operation states include components dislocations and abnormal temperature.

In step S14, the length measuring machine resumes the substrate-transportation function. The daily check and the automatic calibration process ends.

In step S15, the operators are notified of the abnormal operation state of the length measuring machine, and the process ends.

It is to be noted that the software installed in the length measuring machine also generates a trend chart representing daily measured data. With the trend chart, the operators are capable of control the length measuring machine and analyze the stability of the length measuring machine basing on the daily measured data within a designated time period.

The length measuring machines is a TFT-LCD length measuring machine for measuring the total pitch of exposure machines while manufacturing the first layer patterns of the TFT substrates or CF substrates.

In view of the above, by incorporating the substrate-carrying platform and the large-scale substrate, the daily checking and calibrating method of the length measuring machine conducts the daily checking perfectly and efficiently. In addition, when exceptions occur, the operators are alarmed at the first moment such that the measurement of the total pitch of the length measuring machines is enhanced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A daily checking and calibrating method of a length measuring machine, comprising:

step (1) detecting a state of the length measuring machine at a predetermined daily check time;

step (2) stopping transportation of substrates, the process goes to step (3) upon determining the length measuring machine is in an idle state, and waiting until the length measuring machine transit to the idle state if the length measuring machine is in an operational state;

step (3) measuring coordinates of positioning marks on a substrate-carrying platform to generate a measured data file, and comparing the measured coordinates of the positioning marks with predetermined coordinates;

step (4) automatically calculating a calibration value, updating the calibration value to a coordinate parameter file to complete automatic calibration, automatically backing up the coordinate parameter file, the process goes to step (14) when a difference between the measured coordinates of the positioning marks and the predetermined coordinates is smaller than a predetermined value, activating an alarm, the process goes to step (5) when the difference between the measured coordinates of the positioning marks and the coordinate is larger than the predetermined value;

step (5) determining follow-up measures when the difference between the measured coordinates of the positioning marks and the predetermined coordinates is larger than the predetermined value, the determination is made in accordance with a predicted reason causing the difference, the follow-up measures comprises automatic calibration, no calibration, and additional measurements of large-scale substrate;

step (6) the process goes to step (7) upon choosing the automatic calibration, the process goes to step (13) upon determining not to apply the automatic calibration, and the process goes to step (8) upon choosing the additional measurement of the large-scale substrate;

step (7) automatically calculating the calibration value basing on the measured data file generated in step (3), updating the calibration value to the coordinate parameter file to complete the automatic calibration, and backing up the original coordinate parameter file, the process goes to step (14);

step (8) measuring the coordinates of confirmation marks of the large-scale substrate on the substrate-carrying platform to generate a substrate-measured-data file, and comparing the measured coordinates of the confirmation marks and the predetermined confirmation coordinates;

step (9) automatically calculating the calibration value basing on the measured data file generated in step (3), updating the calibration value to the coordinate parameter file to complete the automatic calibration, the process goes to step (14), automatically backing up the coordinate parameter file when the difference between the measured coordinate of the confirmation marks and the predetermined confirmation coordinate is smaller than the predetermined value, and activating the alarm, the process goes to step (10) when the difference between the measured coordinates of the confirmation marks and the predetermined confirmation coordinates is larger than the predetermined value;

step (10) determining the follow-up measures when the difference between the measured coordinates of the confirmation marks and the predetermined confirmation coordinates is larger than the predetermined value, the determination is made in accordance with a predicted reason causing the difference, and the follow-up measures comprises applying automatic calibration or not to apply automatic calibration;

step (11) executing the automatic calibration, the process goes to step (12), and the process goes to step (13) when the follow-up measure is not to apply automatic calibration;

step (12) automatically calculating the calibration value basing on the measured data file generated in step (3), updating the calibration value to the coordinate parameter file to complete the automatic calibration, and backing up the original coordinate parameter, the process goes to step (14);

step (13) the process goes to step (14) upon determining not to apply the automatic calibration, the process goes to step (15) upon determining the length measuring machine is in an abnormal operation state comprising components dislocations and abnormal temperature;

step (14) resuming a substrate-transportation function and the process ends; and step (15) notifying of the abnormal operation state of the length measuring machine, and the process ends.

2. The method as claimed in claim 1, wherein the substrate-carrying platform comprises four cross-shaped positioning marks arranged at four corners, the length of the positioning marks is in the range of between 500 μm and 1000 μm, and the width of the positioning marks is in the range of between 20 μm and 50 μm.

3. The method as claimed in claim 2, wherein the positioning marks are directly formed on the substrate-carrying platform by jet printing or titler.

4. The method as claimed in claim 2, wherein the positioning marks are respectively formed on an adhesive board, and the adhesive boards are adhered to the substrate-carrying platform by glues.

5. The method as claimed in claim 2, wherein the positioning marks are formed by chromium (Cr) or photoresist, when the positioning marks are formed by the photoresist, a protective film is formed outside the positioning marks, the protective film is made by indium tin oxide (ITO) layer or silicon (Si) layer.

6. The method as claimed in claim 2, wherein a coordinate system of the substrate-carrying platform is established by the steps of:
- step (101) for respectively defining the four positioning marks as a first point, a second point, a third point, and a fourth point, the first point and the fourth point are arranged along diagonals of the substrate-carrying platform, the second point and the third point are arranged along diagonals of the substrate-carrying platform, and for measuring the coordinates of the four points;
- step (102) for calculating a middle point of the first point and the third point and labeling the middle point as "A", and for calculating the middle point of the second point and the fourth point and labeling the middle point as "B";
- step (103) for calculating the middle point of the point "A" and the point "B" and labeling the middle point as "O"; and
- step (104) for defining the point "O" as an origin, the direction from the third point toward the first point is the positive direction of a Y axis, and the direction from the third point toward the fourth point is the positive direction of a X axis to establish the coordinate system of the substrate-carrying platform.

7. The method as claimed in claim 6, wherein coordinates of the first point, the second point, the third point, and the fourth point are represented as $(X_1, Y_1)$, $(X_2, Y_2)$, $(X_3, Y_3)$ and $(X_4, Y_4)$, the measured coordinates of the first point, the second point, the third point, and the fourth point are represented as $(X'_1, Y'_1)$, $(X'_2, Y'_2)$, $(X'_3, Y'_3)$, and $(X'_4, Y'_4)$, the calibration values are calculated by:

$$\Delta X(\text{The calibration value in the } X \text{axis}) = [(X'_1 - X_1 + X'_4 - X_4)/2 - (X'_2 - X_2 + X'_3 - X_3)/2]/2;$$

$$\Delta Y(\text{The calibration value in the } Y \text{axis}) = [(Y'_3 - Y_3 + Y'_4 - Y_4)/2 - (Y'_1 - Y_1 + Y'_2 - Y_2)/2]/2; \text{ and}$$

$$\Delta \theta(\text{The calibration value in the orthogonal axis}) = [(X'_3 - X_3 + X'_4 - X_4)/2 - (X'_1 - X_1 + X'_2 - X_2)/2]/2.$$

8. The method as claimed in claim 1, wherein step (8) further comprises transporting the large-scale substrates from a constant-temperature buffer to the substrate-carrying platform by a robot, and transporting the large-scale substrates from the substrate-carrying platform to the constant-temperature buffer by the robot after the measurement is completed.

9. The method as claimed in claim 1, wherein the measured data files generated in step (3) are named by date information.

10. The method as claimed in claim 1, wherein the length measuring machine is a thin film transistor liquid crystal display (TFT-LCD) length measuring machine for measuring a total pitch of exposure machines while manufacturing a first layer patterns of thin film transistor (TFT), TFT substrate or color filtering (CF) substrates.

11. A daily checking and calibrating method of a length measuring machine, comprising:
- step (1) detecting a state of the length measuring machine at a predetermined daily check time;
- step (2) stopping transportation of substrates and the process goes to step (3) upon determining the length measuring machine is in an idle state, and waiting until the length measuring machine transit to the idle state if the length measuring machine is in an operational state;
- step (3) measuring coordinates of positioning marks on a substrate-carrying platform to generate a measured data file, and comparing the measured coordinates of the positioning marks with predetermined coordinates;
- step (4) automatically calculating a calibration value, updating the calibration value to a coordinate parameter file to complete automatic calibration, and automatically backing up the coordinate parameter file, the process goes to step (14) when a difference between the measured coordinates of the positioning marks and the predetermined coordinates is smaller than a predetermined value, activating an alarm, the process goes to step (5) when the difference between the measured coordinates of the positioning marks and the coordinate is larger than the predetermined value;
- step (5) determining follow-up measures when the difference between the measured coordinates of the positioning marks and the predetermined coordinates is larger than the predetermined value, the determination is made in accordance with a predicted reason causing the difference, the follow-up measures comprises automatic calibration, no calibration, and additional measurements of large-scale substrate;
- step (6) the process goes to step (7) upon choosing the automatic calibration, the process goes to step (13) upon determining not to apply the automatic calibration, and the process goes to step (8) upon choosing the additional measurement of the large-scale substrate;
- step (7) automatically calculating the calibration value basing on the measured data file generated in step (3), updating the calibration value to the coordinate parameter file to complete the automatic calibration, and backing up the original coordinate parameter file, the process goes to step (14);
- step (8) measuring the coordinates of confirmation marks of the large-scale substrate on the substrate-carrying platform to generate a substrate-measured-data file, and comparing the measured coordinates of the confirmation marks and the predetermined confirmation coordinates;
- step (9) automatically calculating the calibration value basing on the measured data file generated in step (3), updating the calibration value to the coordinate parameter file to complete the automatic calibration, the process goes to step (14), automatically backing up the coordinate parameter file when the difference between the measured coordinate of the confirmation marks and the predetermined confirmation coordinate is smaller than the predetermined value, and activating the alarm, the process goes to step (10) when the difference between the measured coordinates of the confirmation marks and the predetermined confirmation coordinates is larger than the predetermined value;
- step (10) determining the follow-up measures when the difference between the measured coordinates of the confirmation marks and the predetermined confirmation coordinates is larger than the predetermined value, the determination is made in accordance with a predicted reason causing the difference, the follow-up measures comprises applying automatic calibration or not to apply automatic calibration;
- step (11) executing the automatic calibration, the process goes to step (12), and the process goes to step (13) when the follow-up measure is not to apply automatic calibration;
- step (12) automatically calculating the calibration value basing on the measured data file generated in step (3), updating the calibration value to the coordinate parameter file to complete the automatic calibration, and backing up the original coordinate parameter, the process goes to step (14);

step (13) the process goes to step (14) upon determining not to apply the automatic calibration, and the process goes to step (15) upon determining the length measuring machine is in an abnormal operation state comprising components dislocations and abnormal temperature;

step (14) resuming a substrate-transportation function and the process ends;

step (15) notifying of the abnormal operation state of the length measuring machine and the process ends;

wherein the substrate-carrying platform comprises four cross-shaped positioning marks arranged at four corners, the length of the positioning marks is in the range of between 500 μm and 1000 μm, and the width of the positioning marks is in the range of between 20 μm and 50 m;

wherein the positioning marks are directly formed on the substrate-carrying platform by jet printing or titler;

wherein the positioning marks are formed by chromium (Cr) or photoresist, when the positioning marks are formed by the photoresist, a protective film is formed outside the positioning marks, the protective film is made by indium tin oxide (ITO) layer or silicon (Si) layer;

wherein a coordinate system of the substrate-carrying platform is established by the steps of:

step (101) respectively defining the four positioning marks as a first point, a second point, a third point, and a fourth point, the first point and the fourth point are arranged along diagonals of the substrate-carrying platform, the second point and the third point are arranged along diagonals of the substrate-carrying platform, and measuring the coordinates of the four points;

step (102) calculating a middle point of the first point and the third point, and labeling the middle point as "A", and calculating the middle point of the second point and the fourth point, and labeling the middle point as "B";

step (103) calculating the middle point of the point "A" and the point "B" and labeling the middle point as "O"; and step (104) defining the point "O" as an origin, the direction from the third point toward the first point is the positive direction of the Y axis, and the direction from the third point toward the fourth point is the positive direction of the X axis to establish the coordinate system of the substrate-carrying platform;

wherein coordinates of the first point, the second point, the third point, and the fourth point are represented as $(X_1, Y_1)$, $(X_2, Y_2)$, $(X_3, Y_3)$ and $(X_4, Y_4)$, and measured coordinates of the first point, the second point, the third point, and the fourth point are represented as $(X'_1, Y'_1)$, $(X'_2, Y'_2)$, $(X'_3, Y'_3)$, and $(X'_4, Y'_4)$, the calibration values are calculated by:

$$\Delta X(\text{The calibration value in the } X \text{axis}) = [(X'_1 - X_1 + X'_4 - X_4)/2 - (X'_2 - X_2 + X'_3 - X_3)/2]/2;$$

$$\Delta Y(\text{The calibration value in the } Y \text{axis}) = [(Y'_3 - Y_3 + Y'_4 - Y_4)/2 - (Y'_1 - Y_1 Y'_2 - Y_2)/2]/2; \text{ and}$$

$$\Delta\theta(\text{The calibration value in the orthogonal axis}) = [(X'_3 - X_3 + X'_4 - X_4)/2 - (X'_1 - X_1 + X'_2 - X_2)/2]/2;$$

wherein the step (8) further comprises transporting the large-scale substrates from a constant-temperature buffer to the substrate-carrying platform by a robot, and transporting the large-scale substrates from the substrate-carrying platform to the constant-temperature buffer by the robot after the measurement is completed;

wherein the measured data files generated in step (3) are named by date information; and wherein the length measuring machine is a thin film transistor liquid crystal display (TFT-LCD) TFT-LCD length measuring machine for measuring a total pitch of exposure machines while manufacturing a first layer patterns of thin film transistor (TFT) substrate or color filtering (CF) substrates.

* * * * *